United States Patent [19]
Simpson

[11] Patent Number: 6,126,563
[45] Date of Patent: Oct. 3, 2000

[54] QUICK PURGE TENSIONER WITH INTERNAL PISTON SPRING

[75] Inventor: Roger T. Simpson, Ithaca, N.Y.

[73] Assignee: BorgWarner Inc., Troy, Mich.

[21] Appl. No.: 09/324,262

[22] Filed: Jun. 2, 1999

Related U.S. Application Data

[60] Provisional application No. 60/101,249, Sep. 21, 1998.

[51] Int. Cl.[7] .................................... F16H 7/08
[52] U.S. Cl. .................... 474/110; 474/111; 474/138; 474/109
[58] Field of Search .................... 474/109, 110, 474/111, 117, 136, 138, 140, 101

[56] References Cited

U.S. PATENT DOCUMENTS

| | | | |
|---|---|---|---|
| 4,674,996 | 6/1987 | Anno et al. ........................... | 474/110 |
| 4,772,251 | 9/1988 | Goppelt et al. ...................... | 474/100 |
| 4,792,322 | 12/1988 | Goppelt et al. ...................... | 474/136 |
| 4,850,941 | 7/1989 | Sosson ................................... | 474/110 |
| 4,963,121 | 10/1990 | Himura et al. ....................... | 474/110 |
| 4,985,009 | 1/1991 | Schmidt et al. ...................... | 474/110 |
| 5,030,169 | 7/1991 | Kiso et al. ............................ | 474/110 |
| 5,259,820 | 11/1993 | Mott ...................................... | 474/110 |
| 5,277,664 | 1/1994 | Mott ...................................... | 474/110 |
| 5,352,159 | 10/1994 | Suzuki et al. ........................ | 474/110 |
| 5,702,315 | 12/1997 | Sakai et al. ........................ | 474/110 X |

Primary Examiner—Sherry L. Estremsky
Assistant Examiner—Ankur Parekh
Attorney, Agent, or Firm—Sidley & Austin; Greg Dziegielewski

[57] ABSTRACT

A hydraulic tensioner having a piston slidably received within a bore and biased outward by a spring. A check valve is fixedly mounted in the lower end of the piston. A low pressure fluid chamber is formed within the piston on one side of the check valve. A high pressure fluid chamber is formed on the other side of the check valve between the check valve and the bore. The spring is held within the piston by a reaction member.

8 Claims, 3 Drawing Sheets

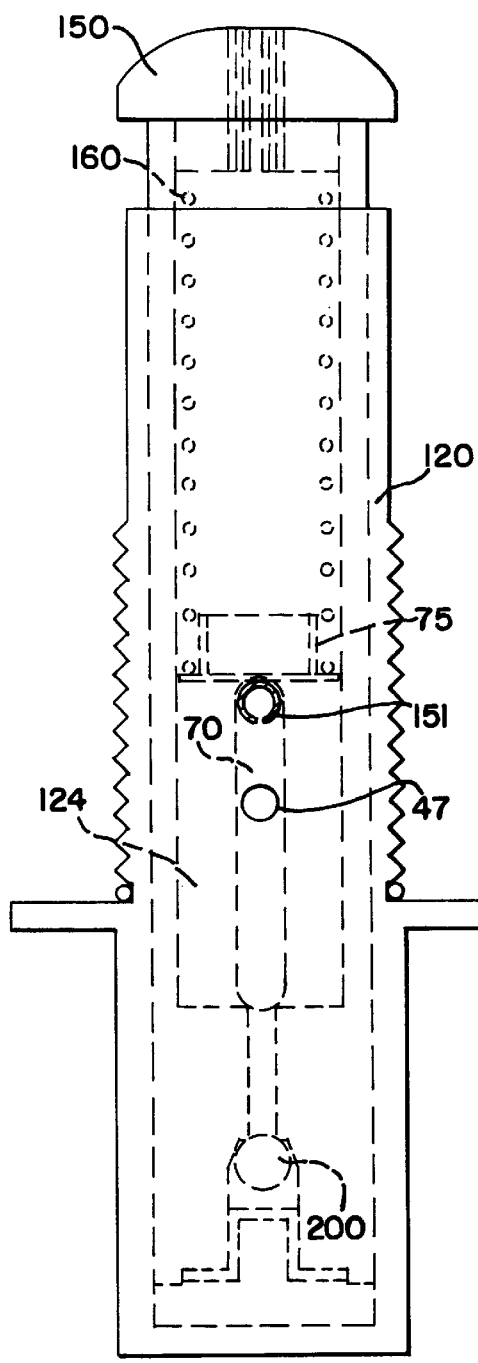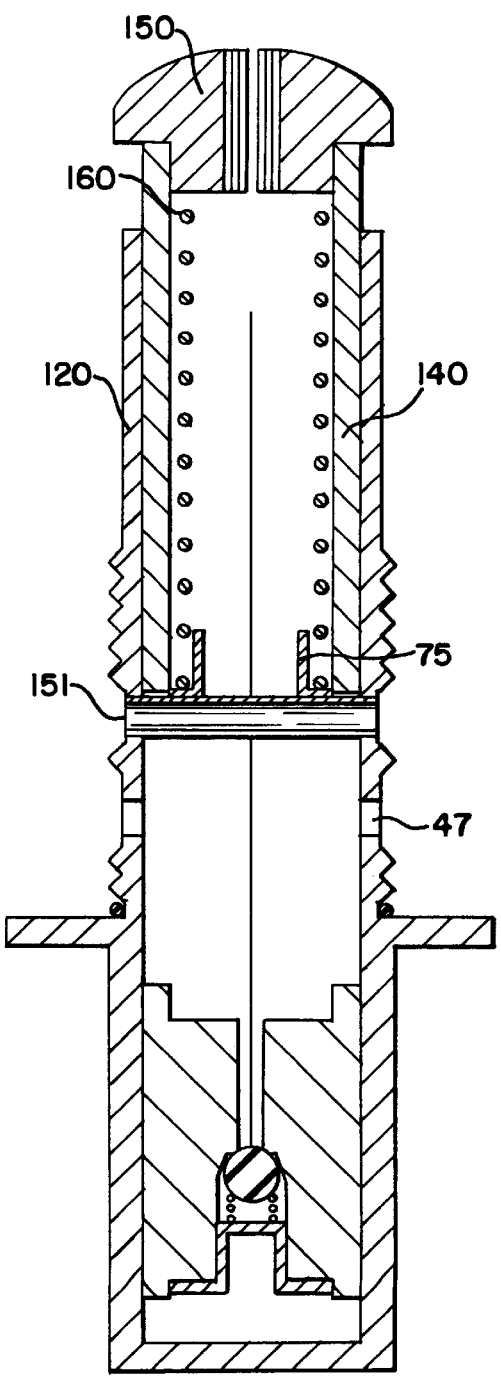

QUICK PURGE TENSIONER WITH INTERNAL PISTON SPRING

This application claims benefit of provisional application U.S. Ser. No. 60/101,249, filed Sep. 21, 1998.

BACKGROUND OF THE INVENTION

This invention relates to a hydraulic tensioner having a spring and check valve mounted within the piston. More particularly, this invention relates to a hydraulic tensioner in which the low pressure chamber, or reservoir, is located within the piston and the high pressure chamber is formed between the check valve located at the open end of the piston and the bottom of the bore in the housing. By locating the high pressure chamber outside of the piston, the size of the high pressure chamber is minimized, which allows a quick purge of air from the high pressure chamber upon start-up. Moreover, the location of the high and low pressure chambers in the present invention provides a hydraulic tensioner with a reduced overall package size.

A tensioning device, such as a hydraulic tensioner, is used as a control device for a power transmission chain as a chain travels between a plurality of sprockets. As a chain transmits power from a driving sprocket to a driven sprocket, one portion or strand of the chain between the sprockets will be tight while the other portion of the chain will be slack. In order to impart and maintain a certain degree of tension in the slack portion of the chain, a hydraulic tensioner provides a piston that presses against a tensioner arm or other chain guiding mechanism.

Prevention of excess slack in the chain is particularly important in the case of a chain driven camshaft in an internal combustion engine in that a chain without sufficient tension can skip a tooth or otherwise throw off the camshaft timing, possibly causing damage or rendering the engine inoperative. However, in the harsh environment of an internal combustion engine, various factors can cause fluctuations in the chain tension.

For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tension. Reverse rotation of an engine, occurring for example in stopping or in failed attempts at starting, can also cause fluctuations in chain tension. For these reasons, a mechanism such as a hydraulic tensioner is desired to ensure the necessary tension on the slack side of the chain.

Hydraulic tensioners are a common method of maintaining proper chain tension. In general, these devices employ a lever arm that pushes against the chain on the slack side of the chain. This lever arm must push toward the chain, tightening the chain when the chain is slack, and must provide resistive force when the chain tightens.

Typically, a hydraulic tensioner includes a piston in the form of a hollow cylinder. The piston slides within a bore in the housing and is biased outward from the housing in the direction of the chain by a spring. The interior of the piston forms a high pressure fluid chamber with the bore or opening in the housing. The high pressure chamber is connected through a one way check valve to a low pressure chamber or reservoir, which provides or is connected to an exterior source of hydraulic fluid. .

Upon start-up, the force of the spring on the piston causes the piston to move outward, which creates a low pressure condition in the high pressure fluid chamber, or pressure differential across the inlet check valve. Accordingly, the inlet check valve opens and permits the flow of fluid from the reservoir, or low pressure chamber, into the high pressure chamber. When the high pressure chamber is sufficiently filled with fluid, the force on the chain that moves the piston inward will be balanced by the outward force from the spring and the resistance force of the fluid in the chamber. The force of the chain against the fluid in the chamber also causes the check valve to close, which prevents further addition of fluid to the chamber.

The present invention achieves a reduction in the overall size of the tensioner unit by mounting the check valve in the end of the piston itself and locating the high pressure chamber between the check valve and the bore that receives the piston. The high pressure chamber is therefore located outside the piston, while the hollow central portion of the piston forms the low pressure chamber. Furthermore, the tensioner is able to purge air quickly because of the small volume of the high pressure chamber. As a result of the ability to purge air quickly, the use of a vent mechanism can be avoided, which eliminates the additional fluid leak path provided by the vent. various types of hydraulic tensioners are described in Suzuki et al., U.S. Pat. No. 5,352,159, Goppett et al., U.S. Pat. No. 4,792,322, and Sosson U.S. Pat. No. 4,850,941. The hydraulic tensioner of Sosson U.S. Pat. No. 4,850,941, has a check valve mounted in the piston, providing a relatively small high pressure chamber. The high pressure chamber is defined by part of the cavity formed in the housing and the piston. The tensioner does not have a spring between the body and the piston or a means for permitting discharge of air from the chamber.

The hydraulic tensioner of U.S. Pat. No. 4,772,251 has a check valve mounted in the base of the piston. The main spring is located outside of the piston. A separate clip is used to keep the piston and body from separating.

SUMMARY OF THE INVENTION

The present invention is directed to a hydraulic tensioner with a check valve and spring mounted within the hollow piston itself. The check valve therefore travels with the piston. In one embodiment, the hydraulic tensioner includes a housing with a central bore. A hollow plunger or piston is slidably received within the bore. A fluid reservoir, or low pressure chamber, is formed within the interior of the hollow piston. A one-way check valve is mounted in the base or open end of the piston. A high pressure fluid chamber is formed between the check valve and the bottom of the bore. The check valve permits fluid flow out of the piston into the high pressure chamber and restricts flow in the reverse direction into the piston.

The check valve therefore creates a high pressure chamber in the fluid chamber between the check valve and the bottom of the bore. A fluid reservoir, or low pressure fluid chamber, is formed within the hollow piston. The piston is biased in a protruding or outward direction from the housing by a spring held within the piston itself. The spring is located on the inside of the piston and is biased against a roll pin member extending through a slot in the side of the piston and housing. A plastic cap is located at the upper end of the piston to compress and capture the other end of the spring.

Fluid is fed through an aperture in a side of the piston and housing from an external source of pressurized fluid into the low pressure fluid chamber which is located inside the hollow piston. Upon outward movement of the piston by the spring, a pressure differential forms across the check valve and the fluid flows from the low pressure chamber through the check valve and into the high pressure chamber. The piston moves outward until the inward force on the piston from the chain is balanced by the outward resistance force of the spring and resistance force from the fluid in the high pressure chamber.

In an alternative embodiment of the present invention, the roll pin that holds the end of the spring within the housing extends across the entire diameter of the low pressure chamber and fits into openings on each side of the piston and the housing.

For a better understanding of these and other aspects and objects of the invention, references should be made to the following detailed description taken in conjunction with the accompanying drawings.

BRIEF DESCRIPTION OF THE DRAWINGS

FIG. 4 is an schematic sectional view of the tensioner of the present invention illustrating the slot and fluid passages.

FIG. 5 is a schematic sectional view of an alternate embodiment of the tensioner of the present invention.

DETAILED DESCRIPTION OF THE PREFERRED EMBODIMENTS

Turning now to the drawings, the present invention is directed to a quick purge tensioner with an internal piston spring. The tensioner includes a generally cylindrical, hollow piston that is slidably received in a bore in a housing. A check valve is mounted at the bottom of the piston. The check valve forms a high pressure fluid chamber between the check valve and the bottom of the bore. The check valve also forms a low pressure chamber, or reservoir, within the interior of the hollow piston.

The piston is biased outward from the bore by a spring. The spring is mounted within the low pressure chamber on the inside of the piston. The piston includes a slot or slots along its side. Hydraulic fluid is supplied from an external source of pressurized fluid to the piston through an aperture in the housing and then through the slot or slots in the piston. The slots or apertures in both the piston and housing also allow for the expulsion of air from the tensioner.

The check valve regulates the flow of hydraulic fluid from the low pressure chamber into the high pressure chamber while preventing flow in the reverse direction. Due to the location of the check valve within the piston, this hydraulic tensioner has a smaller high pressure chamber than a conventional tensioner with a check valve located separate from the piston at the bottom of the housing. The configuration of the present invention enables a quick purge of the air from the high pressure chamber when the tensioner is first operated and air is purged.

Figure 1:
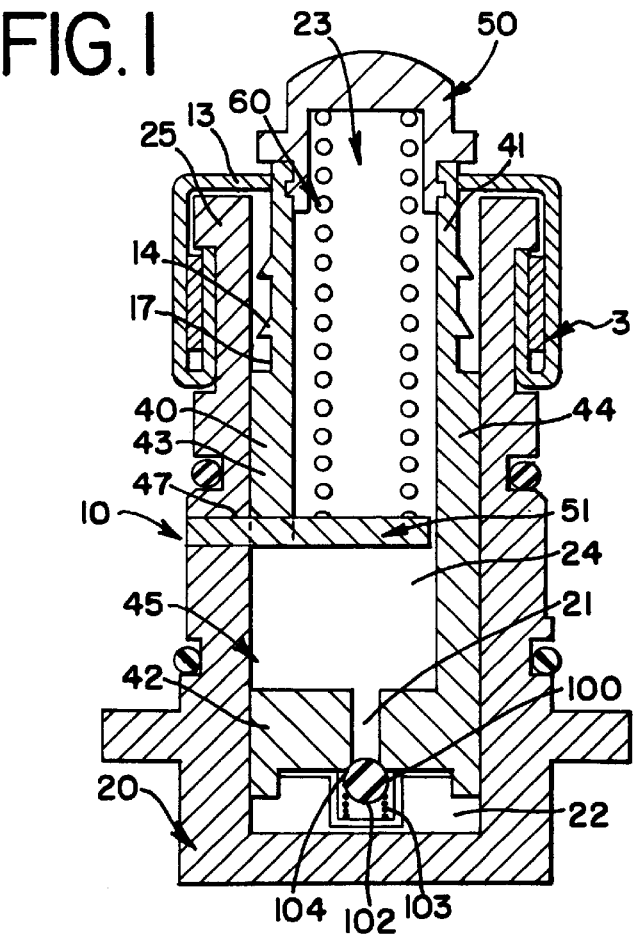
FIG. 1 is a sectional view of the preferred embodiment of the hydraulic tensioner of the present invention with the piston in a retracted position.

FIG. 1 illustrates one embodiment of the present invention. The hydraulic tensioner 10 incorporates both the spring and check valve within the piston. The tensioner 10 includes a cylindrical housing 20 having a bore 23 in its center to provide an opening for the piston. The housing may be a cartridge housing having threads on the outside of the housing so that it can be received in a threaded bore in the engine block.

A hollow cylindrical piston, or plunger, 40 is slidably mounted concentrically in the bore 23 of the housing. The hollow cylindrical piston 40 has an upper end 41, which is closed by a cap 50, a lower end 42, and sides 43 and 44. A one-way check valve 100 is mounted in the lower end of the piston and moves with the piston. A high pressure fluid chamber 22 is formed between the closed end of the piston, or check valve, and the bottom of the bore. The size of the high pressure chamber 22 increases as the piston moves outward. A low pressure chamber 24, or fluid reservoir, is formed within the hollow body of the piston. The piston has an aperture 45 or apertures in the form of a slot in the side of the piston. The aperture permits fluid flow from the external source of fluid through the housing to the low pressure chamber or reservoir formed inside the body of piston.

A roll pin 51 is inserted through the housing and into one side of the piston. The roll pin 51 is rigidly held in the housing. The roll pin 51 functions to bias the end of the spring 60 within the piston. Furthermore, the roll pin serves as an upper limit of axial travel or a stop for the movement of the piston.

A spring 60 biases the piston in an protruding or outward direction from the bore. The spring is mounted inside the piston and rests on the roll pin 51 inserted through the housing, 20 and slot 45 in one side of the piston 40. The other end of the spring rests against the inner surface of a plastic cap 50 which is fit on the top of the piston 40. The spring 60 contacts the inside of plastic cap 50, which is snap fit or pressed on the open end of the piston. The spring biases the piston 40 in a protruding or outward direction from the bore 23. The plastic cap may be attached to the top of the piston by any means known in the art. For example, the plastic cap may be threaded and screwed onto the piston. Although not necessary, the plastic cap, if desired, may include a small opening or orifice that permits venting of air to the atmosphere, as shown in FIG. 5.

The check valve 100 is preferably mounted at the open end of the piston 40 opposite the plastic cap 50 near the bottom of the piston 40. The one way check valve 100 permits the flow of fluid to the (high pressure) fluid chamber 22 from the (low pressure) reservoir chamber 24 of the hydraulic tensioner when a pressure differential is created across the valve. The check valve 100 preferably includes a ball 102 and spring 103 biasing the ball 102 toward a ball seat 104. Alternatively, the check valve 100 may also be a variable orifice check valve as shown and described in U.S. Pat. No. 5,259,820 and U.S. Pat. No. 5,277,664, both of which are owned by the assignee of the present application and which are incorporated herein by reference. The exact configuration of the check valve will ultimately depend of the dynamic response desired.

Figure 2:
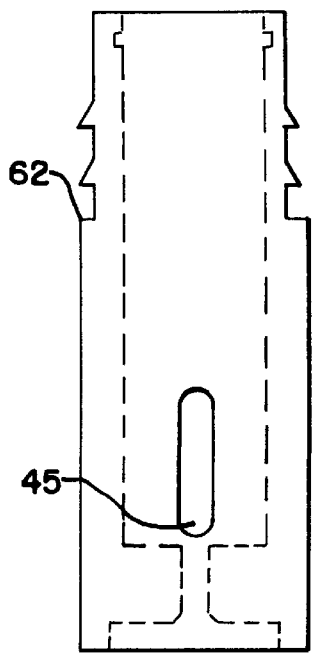
FIG. 2 is a phantom view of the piston of FIG. 1 illustrating the slot and fluid passages.
Figure 3:
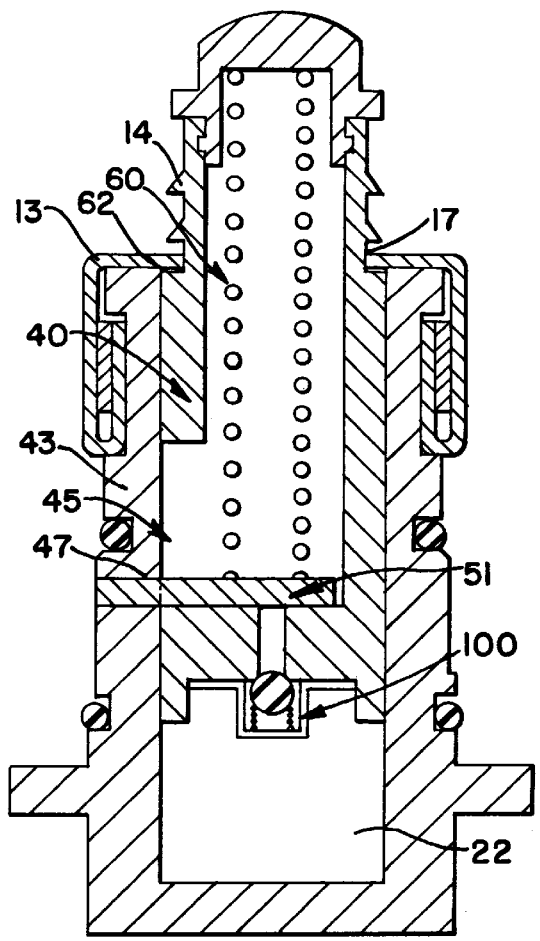
FIG. 3 is a sectional view of the hydraulic tensioner of FIG. 1 with the piston in an extended position.

An anti-back drive clip 3 may be used to retain the piston within the housing. A more detailed description of this anti-back drive clip can be found in commonly assigned pending application U.S. Ser. No. 08/852,925 filed May 8, 1997, now abandoned. Preferably, the anti-back drive clip is a stepped spring steel clip. If such a clip is used, the upper end of the housing will include a shoulder 62 to hold such clip in place as illustrated in FIG. 2. Additionally, the outside of the piston has several grooves or steps 14 formed by wedge shaped projections on the piston 40 to form the rack that contacts the anti-back drive clip 3 as the piston moves outward from bore 23. The anti-back drive clip 3, or ratchet clip, includes flexible tabs 13, which restrict the piston movement within grooves 14 formed by wedge shaped projections on the piston 40 and retention tabs. The flexible tabs may have squared shapes with extensions above the anti-back drive clip 3 that are bent and pressed inwardly against the piston. Alternatively the flexible tabs may be curved and located on the outside of the anti-back drive clips.

Upward movement of the piston 40 causes the tabs 13 to slide along the ramp of each wedge-shaped groove, or rack member made on the piston until the tabs snap into the next groove or rack member. When the tabs 13 hit the last groove 17, which is shaped as a step, the tabs 13 will catch in the last raised portion of the piston 40 and provide an upper limit on movement of the piston 40 within the tensioner 10. This provides an upper limit on piston travel, which retains the piston 40 within the bore 23.

The aperture or slot 47 in the housing body is used to supply hydraulic fluid to the tensioner. The aperture is preferably placed approximately at the midpoint of the housing along the side. In one embodiment, the housing aperture is placed between the mounting threads of the cartridge housing and the closed end of the hydraulic tensioner housing. The housing aperture or slot 47 provides a fluid communication with the aperture 45 of the piston to permit fluid flow from an external source of fluid to the low pressure chamber inside the piston.

Figure 6:
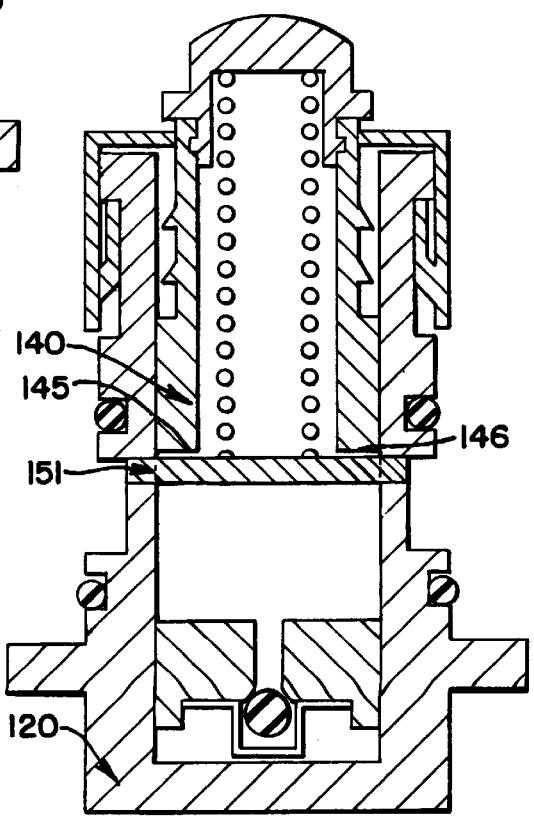
FIG. 6 is a sectional view of an alternative embodiment of the hydraulic tensioner of the present invention, illustrating the pin extending across the entire diameter of the low pressure chamber.

In an alternative embodiment of the present invention, as shown in FIGS. 5 and 6, the roll pin 151 extends across the entire diameter of the housing. The roll pin also extends completely through the piston. This embodiment also includes a conduit 70 as shown in FIG. 4 which connects the low pressure chamber 124 to the check valve 200. The roll pin 151 may include a spring cap 75 which is used to position the spring 160 between the roll pin and plastic cap placed onto the piston top. The plastic cap 150 of the piston may be vented to the atmosphere, if so desired, although such a feature is not necessary.

The hydraulic tensioner 10 of the instant invention is assembled by inserting the cylindrical piston with the check valve assembly mounted on the piston into the bore formed by the cartridge housing. The roll pin 51 is then inserted through the aperture in the housing and through the piston. The spring 60 is then placed within the piston to rest against the roll pin. The plastic cap is then snapped or screwed or placed onto the piston 40 to hold the spring in place between the roll pin and plastic cap.

During start-up of the hydraulic chain tensioner 10 at normal operating conditions, a low pressure condition is created in the high pressure chamber 22, which causes fluid to enter from the low pressure 24 chamber through check valve 100 and begin to fill the high pressure chamber 22. The pressure differential across the check valve 100 opens the valve and allows positive fluid flow into the high pressure chamber 22. Once the inward force of the chain on the piston balances the resistance force of the fluid and spring, the check valve 100 closes, and prevents back flow out of the high pressure chamber 22. During operation, the force of the chain against the piston 40 is balanced by the force of the spring 60 and the pressurized fluid in the high pressure chamber 22. When the oil pressure decreases during shut-down conditions, the anti-back drive clip holds the piston in its last most outward position. Thus, the anti-back drive clip prevents excessive movement of the piston when the fluid pressure decreases. Even when fluid pressure is low or does not exist, such as at engine start-up, the piston is retained in its position by the stop mechanism of the anti-back drive clip.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention, is therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a bore;

a hollow piston having a closed upper end and a lower open end, said piston being slidably received within said bore, said piston having a check valve fixedly mounted within said open end, said piston forming a first fluid chamber between said check valve and said bore, said hollow piston forming a second fluid chamber within said piston between said closed upper end and said check valve in said lower end;

said piston having a slotted aperture along a side wall to permit fluid flow from an external source of fluid into said second fluid chamber inside of said piston;

a spring located within said hollow piston, said spring positioned between said closed piston upper end and a reaction member to bias said piston in a protruding direction from said bore; and said check valve permitting fluid flow from said second fluid chamber into said first fluid chamber while blocking flow in the reverse direction.

2. The hydraulic tensioner of claim 1, wherein said reaction member further comprises a pin member located within an aperture in said housing.

3. The hydraulic tensioner of claim 1 wherein said reaction member further comprises a pin member, said pin member extending completely through said piston and being supported at opposite sides of said bore.

4. The hydraulic tensioner of claim 1, wherein said piston includes a removable cap member at said piston upper end.

5. The hydraulic tensioner of claim 4, wherein said removable cap is attached to said piston by a threaded connection.

6. The hydraulic tensioner of claim 1, wherein said second fluid chamber comprises a low pressure fluid reservoir.

7. The hydraulic tensioner of claim 1, wherein said piston includes a plurality of grooves formed along its outside surface, and a ratchet clip member is positioned radially outward from said piston and said bore, said ratchet clip member having a plurality of flexible tabs constructed and arranged to limit the piston travel in the axial direction, said tabs being normally biased inward to contact said piston grooves.

8. The hydraulic tensioner of claim 2, wherein said piston has a plurality of slotted apertures in said side walls.

* * * * *